United States Patent
Qiao

(10) Patent No.: US 10,462,044 B2
(45) Date of Patent: Oct. 29, 2019

(54) DATA FORWARDING METHOD AND NODE DEVICE FOR MESH NETWORK

(71) Applicant: Silergy Semiconductor Technology (Hangzhou) Ltd., Hangzhou (CN)

(72) Inventor: Junjie Qiao, Hangzhou (CN)

(73) Assignee: SILERGY SEMICONDUCTOR TECHNOLOGY (HANGZHOU) LTD., Hangzhou (CN)

(*) Notice: Subject to any disclaimer, the term of this patent is extended or adjusted under 35 U.S.C. 154(b) by 297 days.

(21) Appl. No.: 15/411,051

(22) Filed: Jan. 20, 2017

(65) Prior Publication Data

US 2017/0214604 A1    Jul. 27, 2017

(30) Foreign Application Priority Data

Jan. 21, 2016  (CN) .......................... 2016 1 0044731

(51) Int. Cl.
*H04L 12/707* (2013.01)
*H04L 12/721* (2013.01)
(Continued)

(52) U.S. Cl.
CPC .............. *H04L 45/24* (2013.01); *H04L 45/12* (2013.01); *H04W 4/023* (2013.01); *H04W 4/80* (2018.02);
(Continued)

(58) Field of Classification Search
CPC ....... H04L 45/00; H04L 45/12; H04L 45/127; H04L 45/24; H04L 47/10; H04W 4/02;
(Continued)

(56) References Cited

U.S. PATENT DOCUMENTS 6,496,478 B1 * 12/2002 Choi ....................... H04L 47/10
370/229
2007/0202878 A1 * 8/2007 Choi ..................... H04W 28/14
455/436
(Continued)

FOREIGN PATENT DOCUMENTS

CN       102118826 A    7/2011
CN       105119785 A    12/2015
(Continued)

OTHER PUBLICATIONS

Office Action, including Search Report, for Chinese Patent Application No. 201610044731.5, dated Jun. 20, 2018, 9 pages.

*Primary Examiner* — Khoa Huynh
(74) *Attorney, Agent, or Firm* — Westman, Champlin & Koehler, P.A.

(57) ABSTRACT

The disclosure relates to a data forwarding method and a node device for a mesh network. The mesh network comprises a plurality of nodes. At least one of the plurality of nodes is a relay node which forwards a data packet from a source node to a destination node. The method includes determining whether or not to forward the data packet in accordance with a type and a forwarding count value of the data package. The forwarding count value is changed in different manners in accordance with the type of the data packet when the data packet is forwarded. The data forwarding method decreases forwarding times of the data packets, reduces power consumption and increases efficiency of network communication.

19 Claims, 5 Drawing Sheets

(51) Int. Cl.
*H04W 4/02* (2018.01)
*H04W 84/18* (2009.01)
*H04W 4/80* (2018.01)

(52) U.S. Cl.
CPC ........... *H04W 84/18* (2013.01); *Y02D 70/142* (2018.01); *Y02D 70/144* (2018.01); *Y02D 70/162* (2018.01); *Y02D 70/22* (2018.01)

(58) Field of Classification Search
CPC ....... H04W 4/023; H04W 4/80; H04W 28/14; H04W 40/02; H04W 84/18; Y02D 70/142; Y02D 70/144; Y02D 70/162; Y02D 70/22
See application file for complete search history.

(56) References Cited

U.S. PATENT DOCUMENTS

2008/0253386 A1\* 10/2008 Barum .................... H04L 45/00
                   370/406
2017/0019828 A1\* 1/2017 Purohit ................ H04W 40/02

FOREIGN PATENT DOCUMENTS

WO  2004/004230 A1  1/2004
WO  2005/067123 A1  7/2005

\* cited by examiner

| command packet | address information | command information | forwarding count value | verification information |

| status packet | address information | status information | forwarding count value | verification information |

DATA FORWARDING METHOD AND NODE DEVICE FOR MESH NETWORK

CROSS-REFERENCE TO RELATED APPLICATION

This application claims the benefit of Chinese Patent Application No. 201610044731.5, filed on Jan. 21, 2016, which is incorporated herein by reference in its entirety.

BACKGROUND OF THE DISCLOSURE

Field of the Disclosure

The present disclosure relates to network data communication technology, and more particularly, relates to a data forwarding method and a node device for mesh network.

Background of the Disclosure

With the development of the Internet of Things technology, more and more intelligent devices are connected to network. Mesh network attracts many attentions due to its advantages of dynamic expansion, high connectivity, high reliability and high stability. An intelligent device can be connected to the mesh network as a terminal, and further access the same or other type of network. Thus, remote management, timing control, parameter adjustment and other functions of the intelligent device are performed.

The mesh network is a network architecture including a plurality of nodes and a controller. The controller may be one or several, but the nodes are more than one. The controller is used for communication schedule between the nodes and for communication route between the nodes and external network. A node can access the external network via the controller. At a time, usually only one controller controls the network. In the prior art, the controller implements the mesh network by broadcasting, under various protocols. For example, the mesh network is based on the Bluetooth 4.0 protocol.

In the mesh network, data are forwarded via an adjacent node, instead of directly connection on long distance, which is known as multi-hop communication. A node forwards a received data packet to implement transfer of data. In this way, a node can be used as a relay node to pass messages. Throughout the network, the nodes forward data based on random delay. However, data forwarding occurs frequently throughout the network, which increases power consumption. If a data packet is forwarded with no restriction, there is even a risk that the network crashes due to packet collisions.

Accordingly, it is desirable to further improve the data communication control method for mesh network so as to reduce the power consumption of network devices and packet collisions.

SUMMARY OF THE DISCLOSURE

In view of the above problems, an object of the present disclosure is to provide a data forwarding method and a node device for restricting the forwarding times of the data packet, so as to reduce power consumption and increase communication efficiency.

According to one aspect of the present disclosure, there is provided a data forwarding method for a mesh network including a plurality of nodes, with at least one of the plurality of nodes as a relay node which forwards a data packet generated by a source node to a destination node, comprising: determining whether or not to forward the data packet in accordance with a type and a forwarding count value of the data package, wherein the forwarding count value is changed in different manners in accordance with the type of the data packet when the data packet is forwarded.

Preferably, the data packet is one of a command packet and a status packet according to the type, an incremental count is performed when the command packet is forwarded, and a decremental count is performed when the status packet is forwarded.

Preferably, the method further comprises obtaining relative positions of the plurality of nodes.

Preferably, the plurality of nodes comprising a controller, and the relative positions of the plurality of nodes indicate a number of nodes at a shortest path between the plurality of nodes and the controller.

Preferably, when the mesh network is initialized, the controller generates a command packet, and the relative positions of the plurality of nodes correspond to the forwarding times for which the command packet arrives at the plurality of nodes via the shortest path.

Preferably, a plurality of nodes stores the relative positions when the mesh network is initialized.

Preferably, a plurality of nodes updates the relative positions when forwarding the command data package.

Preferably, a relative position of the source node is an initial value of the forwarding count value.

Preferably, the source node generates the status packet, and sets the initial value of the forwarding count value when generating the status packet.

Preferably, the step of determination comprises comparing the forwarding count value with a reference value.

Preferably, the data packet is a command packet, and the reference value is a predetermined maximum value.

Preferably, the command packet is forwarded in a case that the forwarding count value is less than or equal to the maximum value, and is not forwarded in a case that the forwarding count value is greater than the maximum value.

Preferably, the data packet is a status packet, and the reference value is a relative position of the relay node.

Preferably, the command packet is forwarded in a case that the forwarding count value is greater than or equal to the relative positions of the relay node, and is not forwarded in a case the forwarding count value is less than the relative positions of the relay node.

Preferably, the method further comprises delaying randomly prior to forwarding the data packet.

According to another aspect of the present disclosure, there is provided a node device used as a relay node in a mesh network for forwarding a data packet generated by a source node to a destination node, comprising: a node controller for obtaining a type of the data packet and a forwarding count value from the data packet; a maximum-value register for storing a maximum value of the forwarding count value; a relative-position identification register for storing a relative position identification of the node device itself; an RF transceiver for receiving and transmitting the data packet; and a transceiver timing controller for providing clock and control signals to the RF transceiver so as to control status of the RF transceiver, wherein the node controller determines whether or not to forward the data packet in accordance with the type and the forwarding count value of the data packet, and changes the forwarding count value in different manners in accordance with the type of the data packet when the data packet is forwarded.

Preferably, the node device further comprises a random-delay controller for providing a delay signal to the transceiver timing controller.

Preferably, when the mesh network is initialized, the node controller obtains the maximum value of the forwarding count value and its relative position identification in accordance with a command packet received, and stores them in the maximum-value register and the relative-position identification register respectively.

Preferably, the node device updates the relative position when forwarding the command data package.

Preferably, during normal operation of the network, the node controller generates a control command indicating whether or not the data packet is forwarded, in accordance with the forwarding count value of the data packet and the relative position of the node controller itself after receiving the data package, and provides the control command to the RF transceiver so as to control a forwarding operation of the node device.

Preferably, the data packet is one of a command packet and a status packet according to the type, and the node controller performs an incremental count when forwarding the command packet, and performs a decremental count when forwarding the status packet.

Preferably, the node controller does not forward the command packet after receiving the command data package in a case that the forwarding count value is greater than or equal to the maximum value.

Preferably, the node controller does not forward the status packet after receiving the status packet in a case that the forwarding count value is less than or equal to the relative position identification of the node device itself.

Preferably, the RF transceiver is a wireless transceiver conforming to at least one protocol selected from a group consisting of Bluetooth protocol, WIFI protocol and ZigBee protocol.

Preferably, the node device is one selected from a group consisting of TVs, refrigerators, water heaters, LED lights, cameras, monitors, sockets and timers, and supports network connection.

The data forwarding method according to the embodiment of the present disclosure processes contents of the command packet and of the status packet in different manners. Data forwarding is controlled based on the type and forwarding count value of the data packet. Because the forwarding count value is changed in different manners in accordance with the type of the data packet, invalid data transmission is reduced, which results in a decrease of the forwarding times of the data packet. Thus, the power consumption is reduced and the communication efficiency of network is improved.

In a preferred embodiment, the relative position of the source node, which generates the data packet, will be used as an initial value, and an incremental count is performed when the command packet is forwarded, the decremental count is performed when a status packet is forwarded. In the step of determining whether or not to forward the data packet, a predetermined maximum value is used as a reference value for the command packet, and a relative position is used as a reference value for the status packet. The comparative result between the forwarding count value of the data packet and the reference value is used for determining whether the data packet is forwarded or not. The method may further restrict transfer direction of the data packet, so as to ensure effectively forwarding of the data packet while reducing the forwarding times of the data packet. Thus, the communication efficiency of network is further improved.

In a preferred embodiment, the node device updates its own relative position identification when forwarding a command packet. Since the node device can dynamically update the relative position, it can adapt to dynamic mesh network architecture. When a node device is removed or inserted during mesh network operation, the node device can still effectively adapt to the new network architecture, and correctly forwards the data packet.

BRIEF DESCRIPTION OF THE DRAWINGS

The above and other objects, advantages and features of the present disclosure will become more fully understood from the detailed description given herein below in connection with the appended drawings, and wherein.

DETAILED DESCRIPTION OF THE DISCLOSURE

Figure 1:
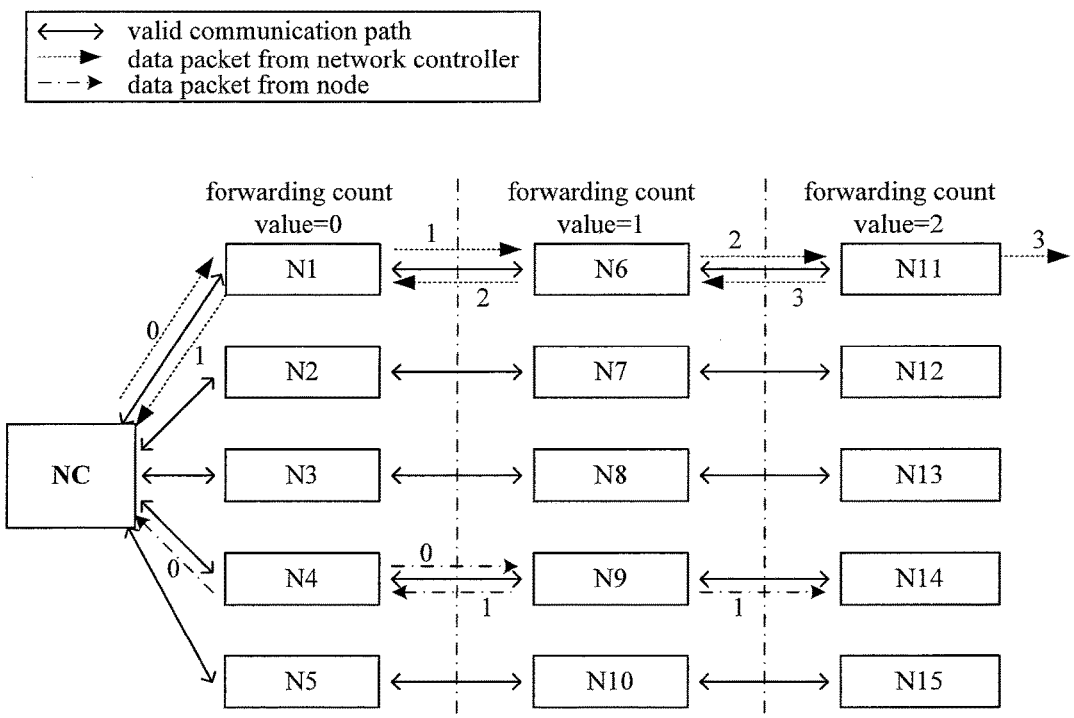
FIG. 1 illustrates a topology of a first type of mesh network.

Exemplary embodiments of the present disclosure will be described in more details below with reference to the accompanying drawings. In the drawings, like reference numerals denote like members. The figures are not drawn to scale, for the sake of clarity. Moreover, some well-known parts may not be shown.

Some particular details of the present disclosure will be described below, such as data structures, network protocols, network topologies, network devices and other hardware structures, in order to more clearly understand the present disclosure. However, it can be understood by one skilled person in the art that these details are not always essential for but can be varied in a specific implementation of the disclosure.

In the present disclosure, the terms "source node" and "destination node" represent two nodes which are desired to generate a data packet and to receive the data packet. A source node and a destination node may be a controller or a node device, a relay node may be a node device which forwards the data packet.

The disclosure can be embodied in various forms, some of which will be described below.

FIG. 1 illustrates a topology of a first type of mesh network. The mesh network includes a plurality of nodes N1 to N5 and a network controller NC. The network controller NC, for example, is a mobile phone, computer, or other type of intelligent terminal. It may also be a dedicated network controller. The node device may be an intelligent device, such as TVs, refrigerators, water heaters, LED lights, cameras, monitors, sockets and timers, and supports network connection.

The first type of mesh network is a single-path network. The network controller NC is a central device and provides a plurality of signal paths. Each signal path comprises a plurality of nodes which are connected in series. The nodes at different signal paths are not connected to each other.

As shown in FIG. 1, with the network controller NC as a center, the nodes N1, N6, and N11 are successively connected at the first signal path, the nodes N2, N7 and N12 are successively connected at the second signal path, the nodes N3, N8 and N13 are successively connected at the third signal path, the nodes N4, N9 and N14 are successively connected at the fourth signal path, the nodes N5, N10 and N15 are successively connected at the fifth signal path. The first to fifth signal paths are connected to a common controller, but not being connected with each other. The node at each signal path can only forward data to the adjacent nodes at the same signal path. That is, each node can forward the data packet to an adjacent node or the controller via one single signal path. For example, a node N9 can only forward data to the adjacent nodes N4 and N14 at the fourth signal path.

The network controller NC communicates with an external network under the protocol such as WIFI protocols, mobile communication protocols and Bluetooth 4.0 protocols and communicates with a plurality of nodes under the protocol such as Bluetooth 4.0 protocols, ZigBee protocols and WIFI protocols. The plurality of nodes communicate with each other under the protocol such as Bluetooth 4.0 protocols, ZigBee protocols and WIFI protocols. The network controller NC controls not only the internal data communication in a mesh network, but also provides routing functionality for the communication between the mesh network and the external network, so that the plurality of nodes in the mesh network can access the external network via the controller.

In a mesh network, there are mainly two types of data packets, including a command packet and a status packet, which are forwarded by the nodes. The network controller NC generates a command packet for transmitting control commands and configuration data to the nodes, so as to control the nodes. On the other hand, both the network controller NC and the nodes can generate status packets, which are used to report the status of the network controller NC and the nodes respectively. The nodes in a mesh network change their status in accordance with the received commands and configuration data, or forward the received data packet.

In the first type of mesh network, according to the existing data forwarding method, no matter what types of data packets are received, the data packets are forwarded in similar manners. In first case, the network controller NC generates a command packet and sends it to all nodes or a specific node. Each node of the nodes N1 to N15 determines whether or not to forward the command packet according to protocol requirements, after receiving the command packet. In second case, the network controller NC generates a status packet and sends it to all nodes or a specific node. Each node of the nodes N1 to N15 determines whether or not to forward the status packet according to the protocol requirements, after receiving the status packet. In third case, one node of the nodes N1 to N15 generates a status packet and forwards it to the adjacent nodes at the same signal path.

According to the above data forwarding method, the plurality of nodes at the same signal path forwards the data packets to the adjacent nodes. The adjacent nodes forward the data packet so as to relay the transmission of the data packets until it is sent to the network controller NC. The node N4 at the fourth signal path will now be described as an example source node. The node N4 generates a status packet and transmits it at the fourth signal path. The node N4 is adjacent to the network controller NC and the node N9. The network controller NC does not forward the status packet after the status packet generated by the node N4 reaches the network controller NC. The node N9 may either transmit backwards or transmit forwards the status packet after it arrives at the node N9. When transmitting backwards, the node N9 forwards the data packet to the next node N14 at the fourth signal path. When transmitting forwards, the node N9 returns the data packets to the previous node N4 at the fourth signal path. Whether transmitting forwards or backwards, the forwarding count value is increased after forwarding each time.

The forwarding count value is always increased according to the data forwarding method for the mesh network. Thus, a maximum value can be used to limit forwarding times. The maximum value is a predetermined value, corresponding to different network sizes. By comparing the forwarding count value and the maximum value, the data packets are prevented to be forwarded unlimitedly. However, the limitation of the maximum value still produces excessive forwarding times. For example, as shown in FIG. 1, the status packets generated by the node N4, are not required to be transmitted backwards.

Figure 2:
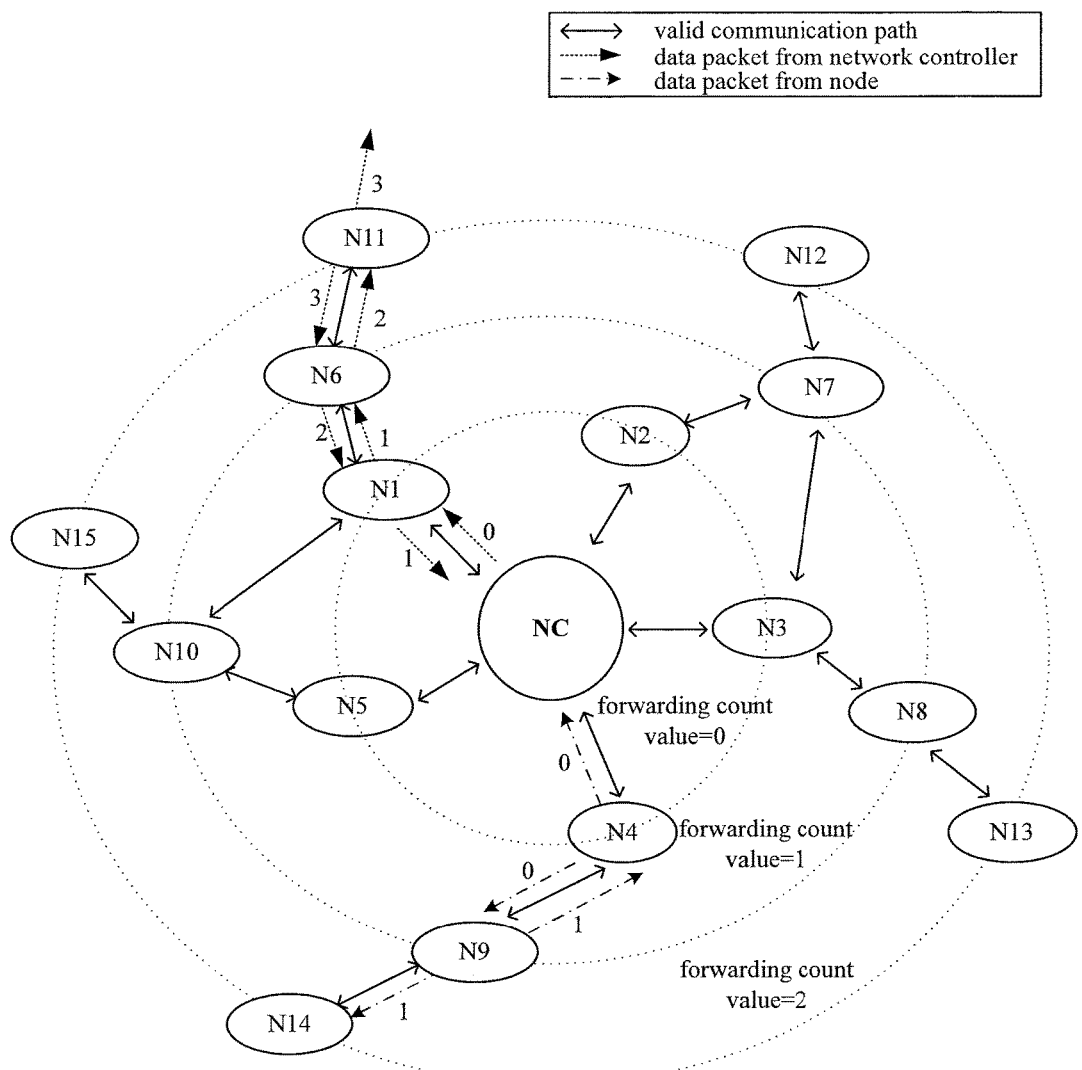
FIG. 2 illustrates a topology of a second type of mesh network.

FIG. 2 illustrates a topology of a second type of mesh network. The mesh network includes a plurality of nodes N1 to N5 and a network controller NC.

The second type of mesh network is a multi-path network. The network controller NC is a central device and provides a plurality of signal paths. Each signal path comprises a plurality of nodes which are connected in series. The nodes at different signal paths may be connected to each other.

As shown in FIG. 2, the network controller NC is a central device and the nodes N1, N6, and N11 are successively connected at the first signal path, the nodes N2, N7 and N12 are successively connected at the second signal path, the nodes N3, N8 and N13 are successively connected at the third signal path, the nodes N4, N9 and N14 are successively connected at the fourth signal path, the nodes N5, N10 and N15 are successively connected at the fifth signal path. The first to fifth signal paths are connected to a common controller, the nodes at different signal paths may be connected to each other. For example, the node N1 at the first signal path and the node N10 at the fifth signal path are connected with each other, the node N7 at the second signal path and the node N3 at the third signal path are connected with each other. The nodes at each path may not only forward the data packet to the adjacent nodes at the same signal path, but also to the adjacent nodes at the adjacent signal path. That is, each node may forward the data packet to the adjacent nodes or the controller via different signal paths.

In the second type of mesh network, according to the existing data forwarding method, no matter what types of data packets are received, the data packets are forwarded in similar manners. In first case, the network controller NC generates a command packet and sends it to all nodes or a specific node. Each node of the nodes N1 to N15 determines whether or not to forward the command packet according to protocol requirements, after receiving the command packet. In second case, the network controller NC generates a status packet and sends it to all nodes or a specific node. Each node of the node N1 to N15 determines whether or not to forward the status packet according to the protocol requirements, after receiving the status packet. In third case, one node of the nodes N1 to N15 generates a status packet and forwards it to the adjacent nodes at the same signal path.

According to the above data forwarding method, a plurality of nodes in a mesh network forward the data packets to the adjacent nodes at the same signal path or at different signal pathes, thereby relaying the transmission of the data packets, so that the data packets are sent to the destination node. The network controller NC is described below as an example source node. The network controller NC generates a command packet, and transmits it at the first signal path. The node N1 is adjacent to the network controller NC. After the command packet generated by the network controller NC arrives at the node N1, the node N1 can forward the data packet forwards or backwards. When transmitting backwards, the node N1 forwards the data packet to the adjacent node N6 at the first signal path, or to the adjacent node N10 at the fifth signal path. When transmitting forwards, the node N1 returns the data packet to the network controller NC. Whether transmitting forwards or backwards, the forwarding count value is increased after forwarding each time.

The forwarding count value is always increased according to the data forwarding method for the mesh network, so that a maximum value can be used to limit forwarding times. The maximum value is a predetermined value, corresponding to different network size. By comparing the forwarding count value and the maximum value, the data packets are prevented to be forwarded unlimitedly. However, the limitation of the maximum value still produces excessive forwarding times.

Figures 3, 4:
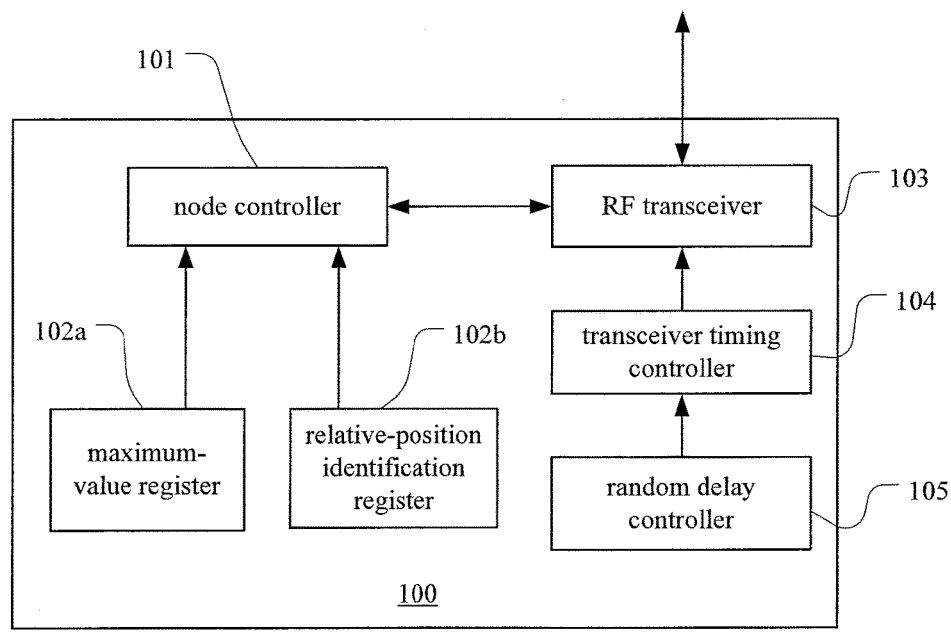
FIG. 3 illustrates a data structure of a data packet according to an embodiment of the present disclosure.
FIG. 4 illustrates a schematic block diagram of a node device according to an embodiment of the present disclosure.

FIG. 3 illustrates a data structure of a data packet according to an embodiment of the present disclosure. The data packet includes not only address information, content information and verification information, but also includes forwarding count value. In the data packet, the address information includes the address of the source node and the address of the destination node, the content information of the command packet includes commands, the content information of the status packet includes status information. The verification information is used for verifying the correctness and completeness of the content information, for example, it is parity information generated based on the content information.

Unlike the prior art, in the data forwarding method according to the present disclosure, the forwarding count value is changed in accordance with the type of the data packet and the relative position of the source node in the mesh network, and the determination of whether or not to forward the data packet is made based on the forwarding count value and the relative position of the relay node in the mesh network.

FIG. 4 illustrates a schematic block diagram of a node device according to an embodiment of the present disclosure. A node device includes a node controller 101, a maximum-value register 102a, a relative-position identification register 102b, an RF transceiver 103, a transceiver timing controller 104, and a random delay controller 105. The node device can be used as a node in the mesh network shown in FIG. 1 and FIG. 2.

The node controller 101 obtains the type of the data packet and forwarding count value from the content of the data packet. For example, the type of the data packet is determined according to the content information of the data packet.

The maximum-value register 102a and the relative-position identification register 102b respectively store the maximum value of the forwarding count value and the relative position identification of the node device itself, respectively. The node controller 101 obtains the maximum value of the forwarding count value from the maximum-value register 102a and the relative position identification of the node device from the relative-position identification register 102b.

The RF transceiver 103 transmits and receives the data packets. For example, it may be a wireless transceiver operated in the frequency such as 2.4 GHz, 5.8 GHz, Sub 1 GHz and the like, and conforming to Bluetooth protocols, WIFI protocols, ZigBee protocols. Because the node device 100 supports frequency hopping modes, the RF transceiver 103 may operate at different operating frequencies. For example, the mesh network is based on the Bluetooth protocols. The node device 100 has three broadcast channels to be selected, and the RF transceiver 103 may operate in a corresponding frequency.

The transceiver timing controller 104 provides clock and control signals to the RF transceiver 103 so as to control the status of the RF transceiver. Thus, the RF transceiver 103 can start a receiving state and a transmitting state, or switch between the receiving state and the transmitting state in accordance with the requirements of the protocols.

Preferably, the node device includes a random delay controller 105 for providing a delay signal to the transceiver timing controller 104. In the mesh network based on data forwarding, the data packets are received and then delayed for a random time before they are sent, in order to prevent packet collisions among the data packets. The random delay controller 105 and the transceiver timing controller 104 are operated together to implement the delay forwarding function.

When the network is initialized, the node controller 101 obtains the maximum value of the forwarding count value and its relative position identification in accordance with the command packet received, and stores them in the maximum-value register and the relative-position identification register.

During normal operation of the network, the controller generates a control command indicating whether or not the data packet is forwarded, in accordance with the forwarding count value of the data packet and the relative position of the controller itself, after receiving the data packet. The control command is provided to the RF transceiver 103, thereby controlling the forwarding of the node device.

Further, in the case of packet forwarding, the node controller 101 changes the forwarding count value in the data packet, if it forwards the data packet, so that the data packet being forwarded includes the forwarding count value with a new value.

Figure 5:
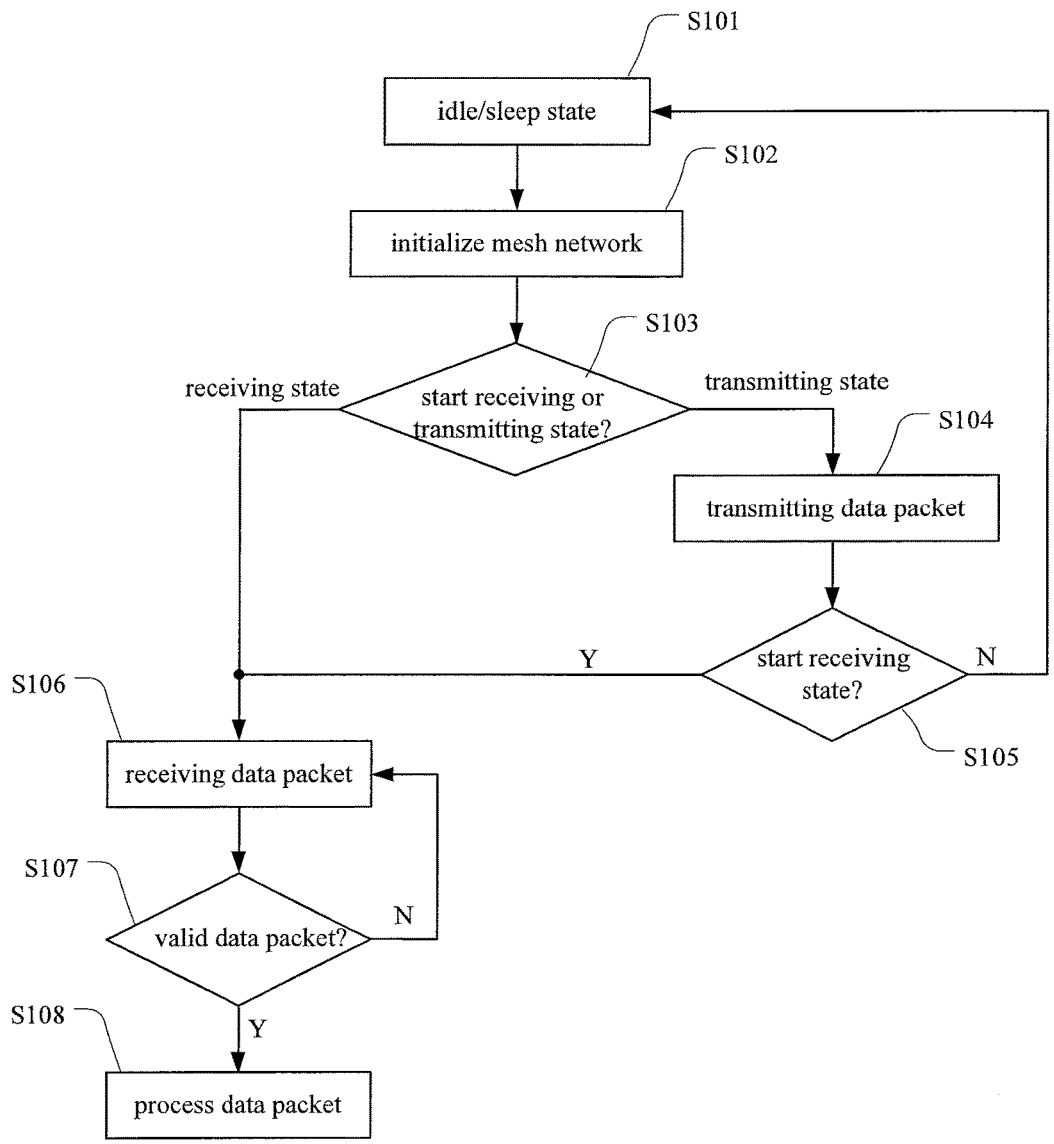
FIG. 5 illustrates a flow chart of the control method of the controller according to an embodiment of the present disclosure.

FIG. 5 illustrates a flow chart of the control method of the controller according to an embodiment of the present disclosure. The main functions of the controller include sending the command packets or its own status packets and receiving the packets from node status. This method can be used in the mesh network as shown in FIG. 1 and FIG. 2, in which various steps of the control method are performed by the controller.

In step S101, the controller is automatically in an idle state or a sleep state in accordance with the requirements of the protocols, which does not transmit or receive data packets, so that the controller has low power consumption.

In step S102, the controller initializes the mesh network.

When the network is initialized, the controller sends the command packets. The controller broadcasts on all broadcast channels of the node devices so that all node devices can receive a command packet.

The command information of the command packet may include communication channel configuration information and the configuration information of the maximum value of the forwarding count value. As described above, when the network is initialized, the node device receives the command packet. Further, the node device configures the operating frequency of the wireless transceiver according to the communication channel configuration information, and the configuration information of the maximum value of the forwarding count value is stored in the maximum-value register of the forwarding count value.

The controller may require that all node devices operate in the same channel, or provide multiple channels to the node devices so that the node devices can choose freely. The configuration information of the maximum value is used to set the maximum value of the forwarding count value on the node devices. The maximum value is the predetermined value, corresponding to different network size. By comparing the forwarding count value and the maximum value, the data packets are prevented to be forwarded unlimitedly.

As described above, the command packet includes the forwarding count value. The node device needs to increase the forwarding count value by 1 each time when it forwards the received data packet. The node device can identify its own relative position in accordance with the command packet received at the first time. It can also use an average value of the forwarding count value obtained from the received command packets for many times to identify its own relative position. The relative position of the node device indicates the number of nodes between the node device and the controller at the shortest path.

In step S103, the controller determines whether or not to start a receiving state or a transmitting state.

If the controller starts a transmitting state, the controller sends the command or status packets in step S104.

In step S105, the controller determines whether or not to start a receiving state. If the controller does not start a receiving state, the controller returns to the idle or sleep state.

If the steps S103 and S105 determine that the controller starts a receiving state, the controller receives the status packets in step S106.

In step S107, the controller determines whether the received status packet is valid or not.

If the received status packet is valid, the controller processes the status packet and records the content information of the status packet, in step S108. Otherwise, the process returns to step S106 in which the controller receives the status packet again.

Figure 6:
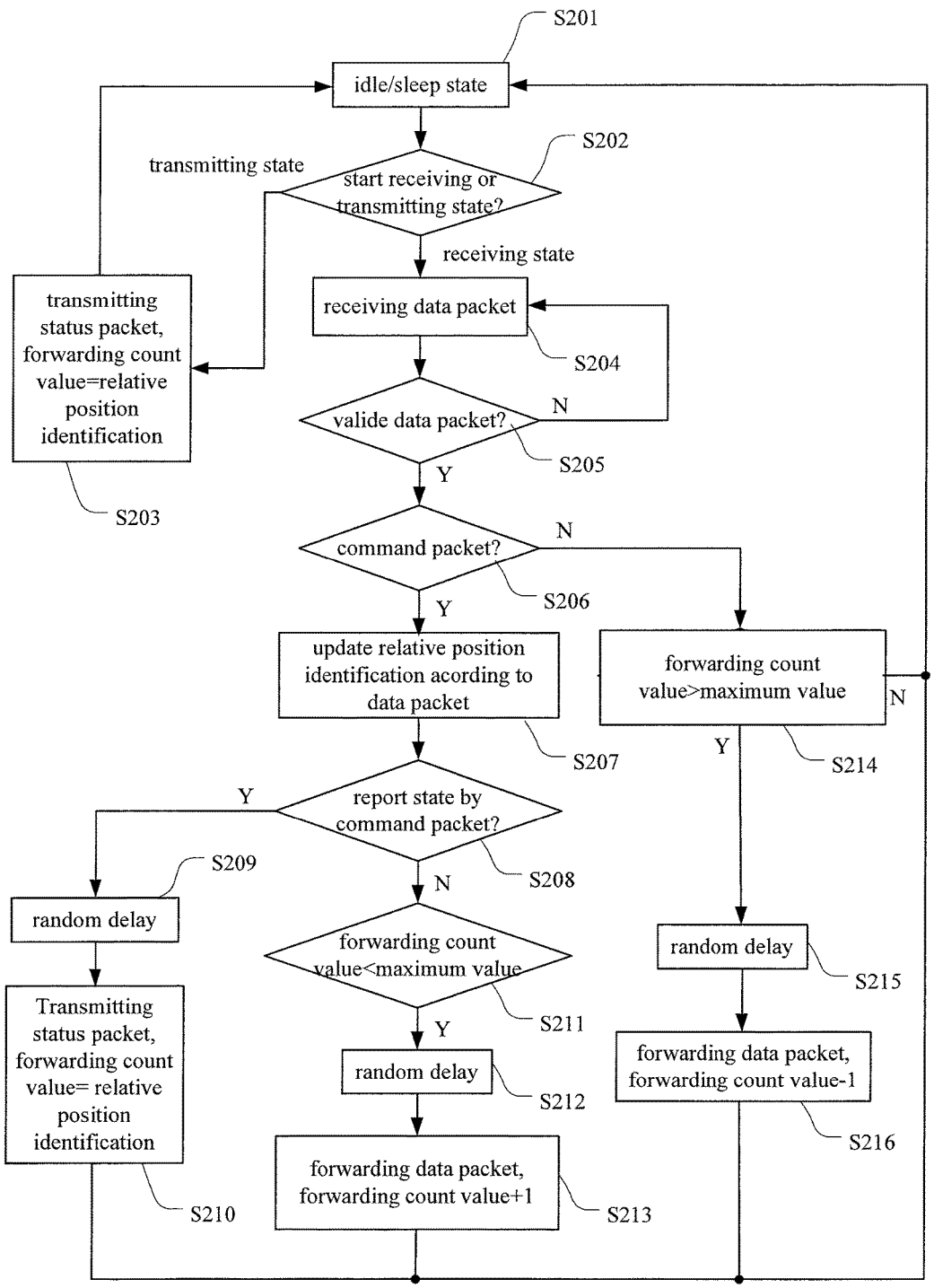
FIG. 6 illustrates a flow chart of a node data forwarding method according to an embodiment of the present disclosure.

FIG. 6 illustrates a flow chart of a data forwarding method of a node according to an embodiment of the present disclosure. The main functions of the node device include receiving the command packets from the controller, sending the status packets of the node device and forwarding the received status command packets. This method can be used in the mesh network as shown in FIG. 1 and FIG. 2, various steps of the control method are performed by the node device.

In step S201, the node device is automatically in an idle state or a sleep state in accordance with the requirements of the protocol, which does not transmit or receive data packets, so that the node device has low power consumption.

In step S202, the node device determines whether or not to start a receiving state or a transmitting state.

If the node device starts a transmitting state, the node device generates and sends its own status packets in step S203. In this step, the node device obtains the relative position identification from the relative-position identification register and writes the relative position identification into the status packet as an initial value of the forwarding count value.

If the node device determines it starts a receiving state in step S202, it receives data packets in step S204. The received data packets may be a command packet generated by the controller, or a status packet generated by the controller or another node device.

In step S205, the node device determines whether the received status packet is valid or not.

If the received packet is valid, the process starts step S206, otherwise, returns to step S204 in which the data packets are received again.

In step S206, the node device determines the type of the received data packet, that is, the received data packet is a command packet or a status packet. For example, the node device may obtain the type of the data packet by parsing the content information of the data packet.

If the received data packet is determined to be a command packet in step S206, in step S207 as a preferred step, the node device acquires the forwarding count value from the command packet, and uses the forwarding count value as the newest relative position identification to update the relative-position identification register. In the step, the relative position of the node device can be dynamically updated to adapt to the mesh network architecture which is dynamically changed. For example, even during the mesh network operation, the node device, even if it is inserted or removed, can still effectively adapt to the new network architecture and forwarding the above data packets correctly.

Next, in step S208, the node device determines whether it is the destination node of the command packet. For example, the node device can obtain the destination node information of the command packet by parsing the content information of the command packet.

If it is determined in step S208 that the node device is the destination node of the command packet, the random delay is performed in step S209. Then, in step S210, the node device generates and transmits its own status packets. In this step, the node device obtains its own relative position identification from the relative-position identification register, and uses the relative position of the node device as an initial value of the forwarding count value to write into the status packet.

If it is determined in step S208 that the node device is not the destination node of the command packet, it further determines whether the forwarding count value of the data packet is less than the maximum value or not. By comparing the forwarding count value and the maximum value, the data packets are prevented to be forwarded unlimitedly.

If it is determined in step S211 that the forwarding count value is greater than or equal to the maximum value, the node device will not forward the command packet and return to the idle or sleep state.

If it is determined in step S211 that the forwarding count value is less than the maximum value, the random delay is performed in step S212. Then, in step S213, the node device forwards the command packet. In this step, the node device reads the forwarding count value from the command packet, and then increases the forwarding count value by 1 to get a new forwarding count value. The new forwarding count value is written into the command packet. The node device returns to the idle or sleep state, after the command packet is forwarded.

If it is determined in step S206 that the received data packet is a status packet, then in step S214, the node device further determines that the forwarding count value of the status packet is greater than its own relative position identification. In this step, the node device reads the forwarding count value from the status packet, and reads its own relative position identification from the relative-position identification register.

If it is determined in step S214 that the forwarding count value of the status packet is less than or equal to the relative position identification of the node device itself, the node device will not forward the command packet and return to the idle or sleep state.

If it is determined in step S214 that the forwarding count value of the status packet is greater than the relative position identification of the node device itself, the random delay is performed in step S215. Then, in step S216, the node device forwards the status packet. In this step, the node device reads the forwarding count value from the command packet, and then increases the forwarding count value by 1 to get a new forwarding count value. The new forwarding count value is written into the command packet. The node device returns to the idle or sleep state, after the status packet is forwarded.

A node device and a data forwarding method according to the embodiment of the present disclosure are described above. The node device may be used either for the first type of mesh network shown in FIG. 1, or for the second type of mesh network shown in FIG. 2. However, the present disclosure is not limited to a particular type of mesh network. For example, in a mesh network, each node can be connected to one or more adjacent nodes to form a complex network topology, so as to provide more redundant communication paths. The data forwarding method according to the present disclosure can be applied to this complex network topology.

It should also be understood that the relational terms such as "first", "second", and the like are used in the context merely for distinguishing one element or operation form the other element or operation, instead of meaning or implying any real relationship or order of these elements or operations. Moreover, the terms "comprise", "comprising" and the like are used to refer to comprise in nonexclusive sense, so that any process, approach, article or apparatus relevant to an element, if follows the terms, means that not only said element listed here, but also those elements not listed explicitly, or those elements inherently included by the process, approach, article or apparatus relevant to said element. If there is no explicit limitation, the wording "comprise a/an . . . " does not exclude the fact that other elements can also be included together with the process, approach, article or apparatus relevant to the element.

Although various embodiments of the present disclosure are described above, these embodiments neither present all details, nor imply that the present disclosure is limited to these embodiments. Obviously, many modifications and changes may be made in light of the teaching of the above embodiments. These embodiments are presented and some details are described herein only for explaining the principle of the disclosure and its actual use, so that one skilled person can practice the present disclosure and introduce some modifications in light of the disclosure. The disclosure is intended to cover alternatives, modifications and equivalents that may be included within the spirit and scope of the disclosure as defined by the appended claims.

The invention claimed is:

1. A data forwarding method for a mesh network including a plurality of nodes, with at least one of said plurality of nodes as a relay node which forwards a data packet generated by a source node to a destination node, comprising:
   obtaining a relative position of said relay node;
   determining a type of said data packet, which is one of a command packet and a status packet;
   forwarding said command packet and increasing a forwarding count in a case that said forwarding count has a value that is less than or equal to a maximum value;
   forwarding said status packet and decreasing said forwarding count in a case that said forwarding count has a value that is greater than or equal to said relative position.

2. The method according to claim 1, wherein said relay node each comprise a network controller, and said relative position of said relay node indicates a number of nodes at a shortest path between said relay node and said network controller.

3. The method according to claim 2, wherein when said mesh network is initialized, said network controller generates said command packet, and said relative position of said relay node corresponds to said forwarding times for which said command packet arrives at said relay node via said shortest path.

4. The method according to claim 2, wherein said relay node stores said relative position when said mesh network is initialized.

5. The method according to claim 4, wherein said relay node updates said relative position when forwarding said command data package.

6. The method according to claim 1, wherein a relative position of said source node is an initial value of said forwarding count.

7. The method according to claim 6, wherein said source node generates said status packet, and sets said initial value of said forwarding count when generating said status packet.

8. The method according to claim 1, wherein said command packet is not forwarded in a case that said forwarding count is greater than said maximum value.

9. The method according to claim 1, wherein said command packet is not forwarded in a case said forwarding count is less than said relative position of said relay node.

10. The method according to claim 1, further comprising delaying randomly prior to forwarding said data packet.

11. A node device used as a relay node in a mesh network for forwarding a data packet generated by a source node to a destination node, comprising:
    a node controller for obtaining a type of said data packet and a forwarding count value from said data packet;
    a maximum-value register for storing a maximum value of said forwarding count;
    a relative-position identification register for storing a relative position of said node device itself;
    an RF transceiver for receiving and transmitting said data packet; and
    a transceiver timing controller for providing clock and control signals to said RF transceiver so as to control status of said RF transceiver,
    wherein said node controller obtains said relative position of said relay node, determines a type of said data packet, which is one of a command packet and a status packet, forwards said command packet and increasing a forwarding count in a case that said forwarding count has a value that is less than or equal to a maximum value, and forwards said status packet and decreasing said forwarding count in a case that said forwarding count has a value that is greater than or equal to said relative position.

12. The node device according to claim 11, further comprising a random-delay controller for providing a delay signal to said transceiver timing controller.

13. The node device according to claim 11, wherein when said mesh network is initialized, said node controller obtains said maximum value of said forwarding count and its relative position in accordance with a command packet received, and stores them in said maximum-value register and said relative-position identification register respectively.

14. The node device according to claim 13, wherein said node device updates said relative position when forwarding said command data package.

15. The node device according to claim 11, wherein during normal operation of said network, said node controller generates a control command indicating whether or not said data packet is forwarded, in accordance with said forwarding count of said data packet and said relative position of said node controller itself after receiving said data package, and provides said control command to said RF transceiver so as to control a forwarding operation of said node device.

16. The node device according to claim 11, wherein said node controller does not forward said command packet after receiving said command data package in a case that said forwarding count is greater than or equal to said maximum value.

17. The node device according to claim 11, wherein said node controller does not forward said status packet after receiving said status packet in a case that said forwarding count is less than said relative position of said node device itself.

18. The node device according to claim 11, wherein said RF transceiver is a wireless transceiver conforming to at least one protocol selected from a group consisting of Bluetooth protocol, WIFI protocol and ZigBee protocol.

19. The node device according to claim 11, wherein said node device is one selected from a group consisting of TVs, refrigerators, water heaters, LED lights, cameras, monitors, sockets and timers, and supports network connection.

* * * * *